United States Patent [19]

Orbom

[11] Patent Number: 5,013,176
[45] Date of Patent: May 7, 1991

[54] CONTINUOUS CONNECTOR

[76] Inventor: Eric W. Orbom, 5812 Venice Blvd., Los Angeles, Calif. 90019

[21] Appl. No.: 340,861

[22] Filed: Apr. 20, 1989

[51] Int. Cl.$^5$ ............................................. F16B 7/04
[52] U.S. Cl. ................................... 403/171; 403/173; 403/175; 403/218; 52/648
[58] Field of Search .............. 403/170, 171, 172, 176, 403/217, 218, 175, 174, 178, 173, 219, 398; 52/648

[56] References Cited

U.S. PATENT DOCUMENTS

| | | | |
|---|---|---|---|
| 1,150,781 | 8/1915 | Louden | 403/218 |
| 1,393,842 | 10/1921 | Slater | 403/178 |
| 1,444,491 | 2/1923 | Baldwin . | |
| 1,831,838 | 11/1931 | Bearly . | |
| 2,466,148 | 4/1949 | Birr | 403/173 X |
| 2,715,537 | 8/1955 | Hofheimer | 403/173 |
| 2,847,237 | 8/1958 | Ackerman | 403/218 |
| 2,879,110 | 3/1959 | Hardie | 403/173 |
| 3,357,727 | 12/1967 | Finkenstein et al. . | |
| 3,563,580 | 2/1971 | Black . | |
| 3,834,549 | 9/1974 | Burg et al. | 403/175 X |
| 3,992,118 | 11/1976 | Siegers | 403/171 |
| 4,076,431 | 2/1978 | Burvall . | |
| 4,322,176 | 3/1982 | Johnson, Jr. | 403/170 X |
| 4,324,083 | 4/1982 | Johnson, Jr. | 403/217 X |
| 4,325,648 | 4/1982 | DeBliquy et al. | 403/218 |
| 4,343,562 | 8/1982 | Almeland et al. . | |
| 4,347,690 | 9/1982 | Wallace, Jr. | 403/217 X |
| 4,348,129 | 9/1982 | Conforti | 403/218 |
| 4,355,918 | 10/1982 | Van Vliet | 403/170 |
| 4,480,418 | 11/1984 | Ventrella | 403/171 X |
| 4,557,097 | 12/1985 | Mikulas, Jr. et al. . | |
| 4,606,669 | 8/1986 | DeBliquy | 403/170 |
| 4,706,906 | 11/1987 | Roman et al. | 403/175 X |

Primary Examiner—Peter M. Cuomo
Attorney, Agent, or Firm—Pretty, Schroeder, Brueggemann & Clark

[57] ABSTRACT

The present invention relates to a connector for a tubular truss assembly which is formed of tubes loosely fit between selected adjacent ones of the connectors. The tubes are held in place either by set screws in connector receptacles into which the tubes are mounted or by tensioning elements connected between connectors for urging the connectors together. The manner of coupling and securement provides for very rapid assembly, minimization of stress concentrations and turning connector assemblies to form nonplanar structures.

5 Claims, 12 Drawing Sheets

CONTINUOUS CONNECTOR

BACKGROUND OF THE INVENTION

1. Field of the Invention

The present invention relates to a connector for tubular truss assemblies. More specifically, the invention relates to a connector which forms a part of a truss cell wherein tubing interconnected between selected adjacent connectors is loosely held in the connector to facilitate shaping the truss assembly to desired contours and for distributing the forces and mechanical stresses existing throughout the assembly, to each member thereof.

2. Description of the Prior Art

The formation of truss assemblies using connectors of the prior art generally involves either the welding or bolting rigidly together of the constituent parts of the assemblies. Examples of such assemblies are shown in U.S. Pat. Nos. 3,596,950, 4,101,230 and 4,343,562. With the application of strong transverse forces on the truss assemblies described in the above patents the rigid welds tend to fracture or tear. The truss assemblies in the prior art generally will load the plate elements to which they are welded. Usually this loading is undesirable since it may easily lead to laminar tearing of the plate material.

Other connectors in the prior art provide rigid connectors incapable of contouring to form desired geometric shapes such as cylinders and semi-spherical or completely spherical domes. Examples of such connectors are described in U.S. Pat. Nos. 1,144,491, 3,563,580 and 4,076,431. In each case the resulting structure is limited solely to specific geometric shapes such as tetrahedral or fixed sloped roofs for portable car or boat storage.

The present invention remedies the deficiencies of the prior art. The connector includes a plurality of receptacles for receiving in a loosely fit fashion tubing which interconnects adjacent connectors. The truss assembly is maintained in a unitary structure by means of either securing the tubing to the respective connector or by means of truss wires connected to selected ones of adjacent connectors and biased to urge the interconnected connectors together. The structural members of the truss are held in position in compression in a loose fit fashion. This unique manner of loose coupling allows slight movement of expansion and contraction and the distribution and defocusing of forces throughout the truss assembly.

The loose coupling diminishes the potential of fracture and tearing characterizing the aforementioned connectors of the prior art. Since the forces are distributed throughout the truss assembly, the undesirable concentration of forces and stress is minimized. Because stress concentrations are minimized lighter and weaker structural tubing can be used.

Yet another unique feature of the loosely fitting coupling of the truss tubing and connectors is the ability to "turn corners" of the surfaces it forms to create a nonplanar assembly either for functional or aesthetic purposes.

To form desired structural shapes such as a cylinder it is required to turn the plane of the face of the truss assembly by the slight shortening of the tubing on the inner side of the turn desired to be formed. Spheres, domes, squares, rectangular and composite truss cells such as hexagonal, octagonal and the like are within the contemplation of the present invention.

Moreover the loose fitting concept which is contrary to designs of the prior art provide for rapid assembly and disassembly. The truss once quickly assembled is less prone to the damaging effects induced by movement of the assembly because of the "forgiveness" inherent in non-rigid structures. Once assembled, parts of the truss assembly can be removed without collapse of the entire assembly. Thus alterations in design during assembly is possible without substantial breakdown of the entire truss assembly.

SUMMARY OF THE INVENTION

In accordance with the invention a connector for use in a tubular truss assembly is provided having an essentially planar base portion and a receptacle means which is secured to and extends normally from the base portion. A cover portion includes an aperture for slidable mounting on the receptacle means. A plurality of indentations are disposed along radii of the cover portion. The indentations open downwardly toward the base portion for gripping the tubular truss members between the cover and base portions. Means are provided for urging the cover and base portion together for gripping the tubular truss members therebetween.

Preferably the indentations are triangular and the cover portion is slidable on the receptacle for adapting to varying sized tubing.

Preferably the base and cover portions include paired apertures for receiving bolt means for urging together the base and cover portions.

Preferably the base portion includes indentations similar to and in matching relationship to the indentations of the cover portion.

Preferably a tubular truss includes a plurality of connectors and a plurality of tubes coupled to and between adjacent ones of selected connectors.

The truss also includes tensioning means coupled between selected adjacent ones of the connectors for urging the connectors together.

DETAILED DESCRIPTION OF THE INVENTION

The foregoing and other objects, features and advantages of the invention will be apparent from the following more particular description of preferred embodiments of the invention, as illustrated in the accompanying drawings.

Figure 1:
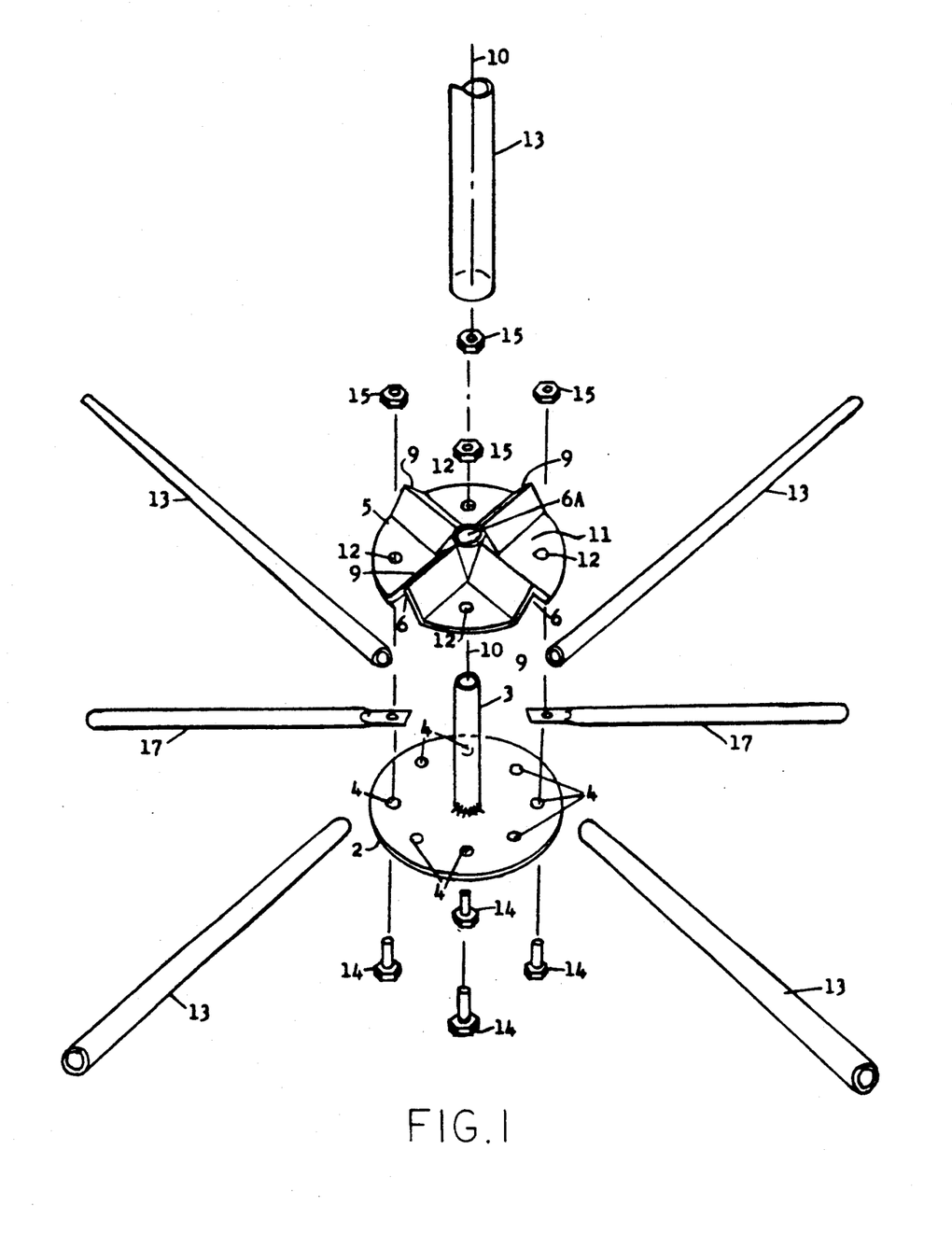
FIG. 1 is an exploded perspective view of a connector according to the invention.
Figure 2A:
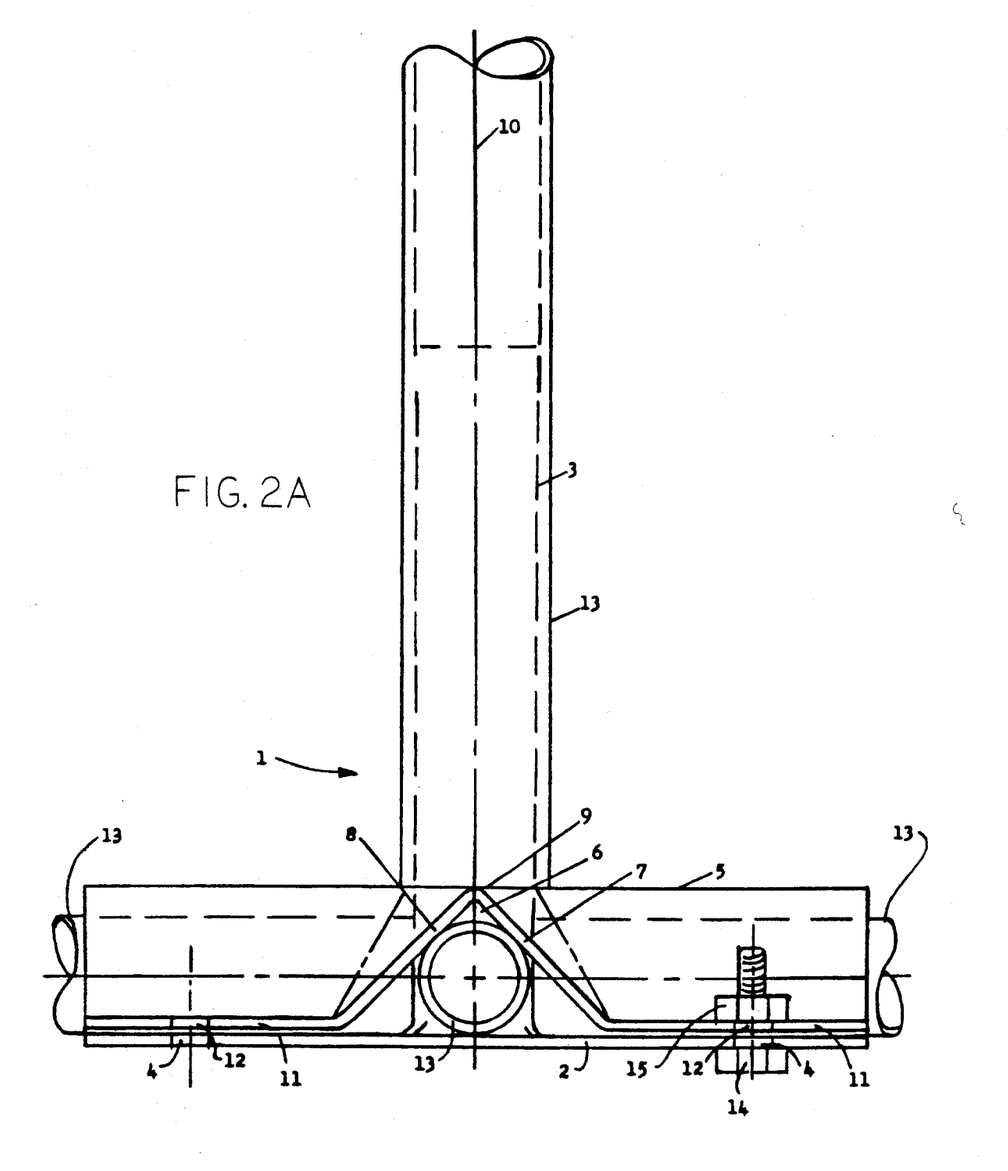
FIG. 2A is a front elevation view of the connector of FIG. 1.
Figure 2B:
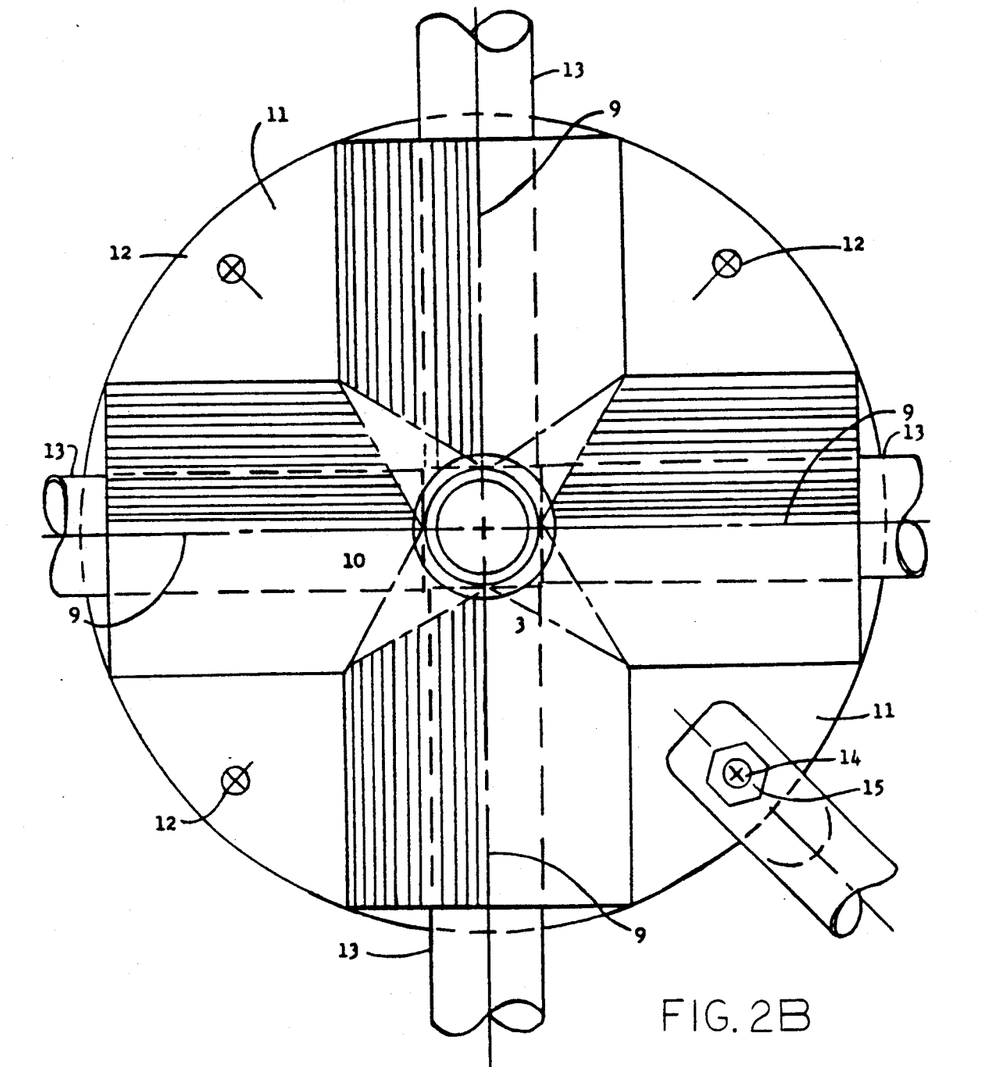
FIG. 2B is a top view of the connector of FIG. 1.

In particular FIGS. 1, 2A and 2B there is shown a first embodiment of the present invention. The connector 1 includes an essentially flat, rigid base portion 2. The base may be formed of a number of structural materials such as, for example, cold rolled steel and the like. The shape of the base portion 2 is essentially planar and as shown in FIG. 1 has a circular outer periphery. As will be described later the shape of the outer periphery may conveniently be in the shape of other geometrical forms such as square or truncated triangular which is usually dependent upon the number of receptacles provided in the connector.

Extending normally from the base portion 2 is hollow tubular receptacle 3. The receptacle 3 may be secured to the base 2 by conventional attachment methods such as welding. Spaced apart bolt holes 4 are provided in and extend through the base portion 2.

Mounted to the base and on the receptacle 3 is cover portion 5. The cover portion 5 includes a central opening 6A which has a contour similar to but slightly larger than the receptacle 3. This permits the cover portion 5 to slide freely on the receptacle 3 during assembly. Spaced about the cover portion 5 and with respect to base portion 2 are downward opening indentations 6. The indentations have side walls 7 and 8 and an apex 9. The apex 9 lies along a radius originating from receptacle axis 10. As shown best in FIG. 1 the indentations 6 are generally triangular in cross-section with the base of the cross-section being proximal and the apex being distal with respect to the base portion 2.

The cover portion regions 11 which extend in the region between the indentations 6 are essentially flat and when the cover portion 5 is mounted on the receptacle 3, the regions 11 lie in a plane parallel to the plane of the base portion 2. Disposed about the cover portion 5 are bolt holes 12 which are spaced to be coaxial with corresponding bolt holes 4. In forming a continuous connector assembly, tubing 13 which is to be inserted in and secured by the connector 1, is inserted within the space provided by the indentations 6. Advantageously the triangular cross-section permits use of variable sized tubing since the cover portion 5 will be located in position dependent upon the size of the tube 13. Thus larger sized tubing 13 will cause the cover portion 5 to be spaced further apart from the base portion 2 whereas smaller sized tubing 13 will cause the cover portion 5 to be spaced closer to the cover portion 5. The shape of the indentations therefore provides means for adaptively securing varying sized tubing.

Cover portion 5 is urged towards the base portion 2, for maintaining tubes 13 therebetween in locking relationship, by means of bolts 14 which are located through correspondingly aligned holes 4 in the base portion 2 and holes 12 in the cover portion 5 and are secured in place by means of bolt nuts 15.

As will be explained in more detail later a tension wire or brace 17 is coupled to the connector 1 as well as to an adjacent connector for urging adjacent connectors together. As shown in FIG. 1 the brace 17 is sandwiched between the base plate 2 and the cover plate 5. However, the brace 17 may also be secured to the connector 1 on the upper surface of the cover plate 5 or to the lower surface of base plate 2.

For applications where it is desired to provide a less rigid and more flexible connector, the bolts 14 may be left with a slight slack. Additionally the receptacle 3 may be reduced with respect to the tubing size so that there is provided sufficient space for slight movement of the tube when located in the receptacle. For constructing contoured structures this provision for slight relative motion or loose fit coupling of the tubing within the connector facilitates contouring the structure into other than planar surfaces, such as for example, slight rounded, domed, or cylindrical contours are achievable.

Figure 3:
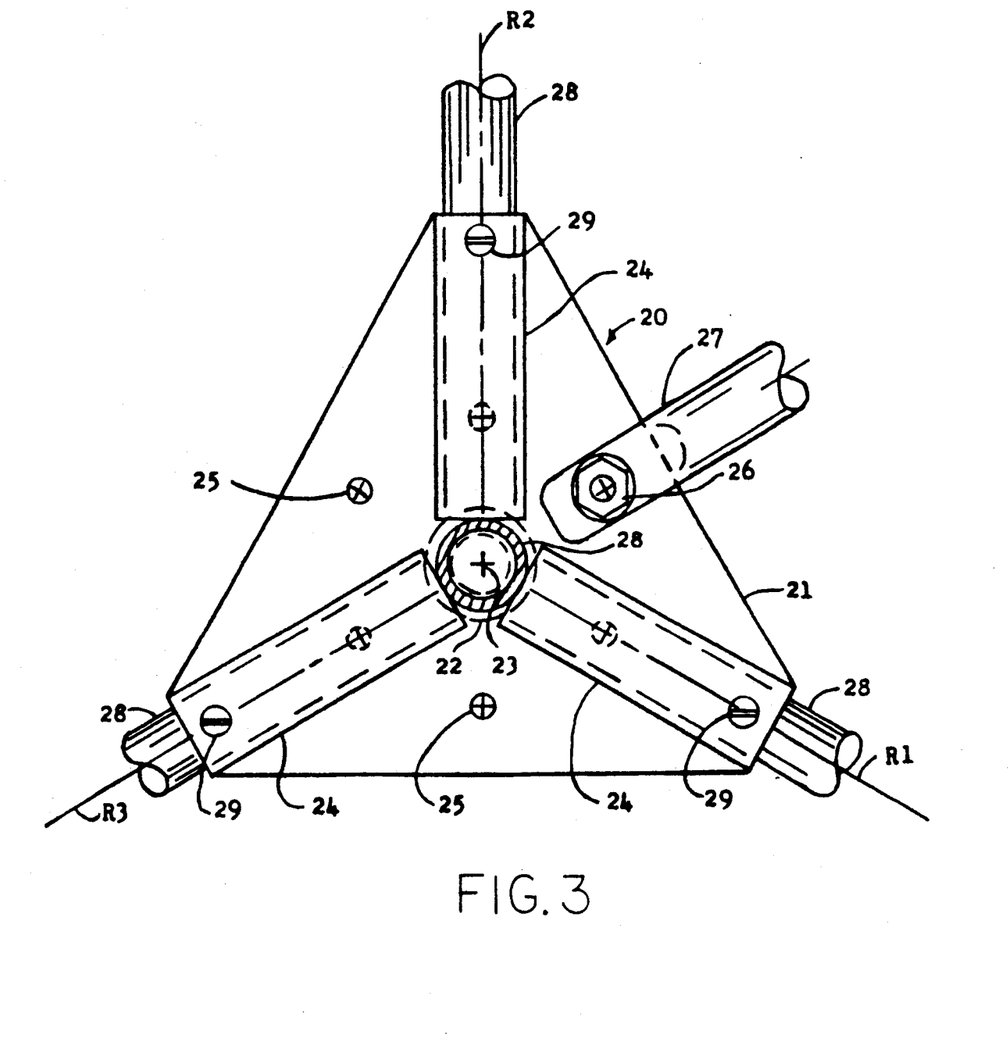
FIG. 3 is a top view of an alternate embodiment of a connector according to the invention.
Figure 4:
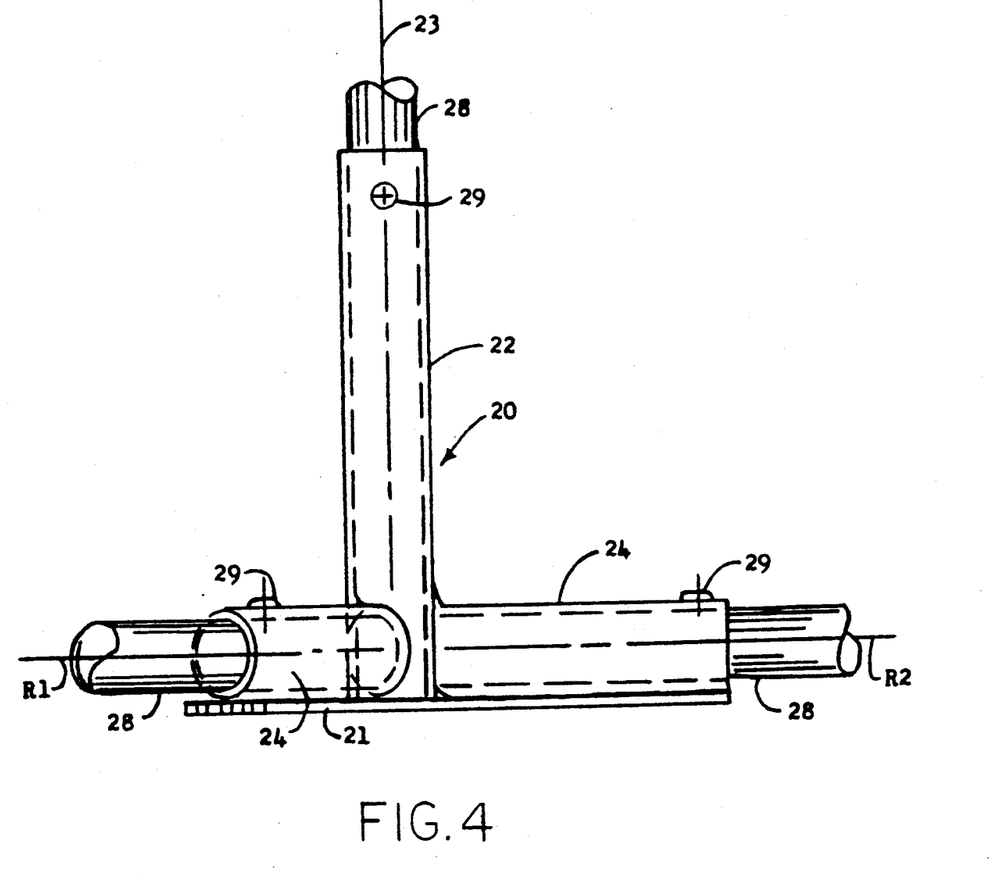
FIG. 4 is a side elevation view of the connector of FIG. 3.

An alternate embodiment of the present invention is shown in FIGS. 3 and 4 to which reference is now made. The connector 20 comprises a substantially planar base plate 21 having a tubular receptacle 22 which is normal to the base plate 21 extending along an axis 23. As shown in FIG. 3 the receptacle is circular in cross-section for receiving tubing of circular cross-section having a diameter less than that of the receptacle. It should be noted and as will be described later, the present invention contemplates receptacle and tubular cross-sections in other geometrical shapes other than circular, such as, for example, square or rectangular.

Spaced apart along radii R1, R2 and R3 are second receptacles 24. The receptacles 24 lie in the plane parallel to the plane formed by and are attached to base plate 21. Located on the base plate 21 and spaced between adjacent receptacles 24 are holes 25. Securing means such as bolt 26 are mounted through the holes 25 for securing tension truss 27 to the base plate 21. The tension truss 27 serves to urge together adjacent connectors to which it is attached. Although only one tension truss is shown in FIG. 3 it is to be understood that each other of the holes 25 may have a tension truss secured thereto depending upon the nature and construction of the truss assembly.

As shown in FIG. 3 tubes 28 are insertable within the receptacle 24 typically through the entire length of the receptacle. A set screw 29 having screw threads matching that machined in the receptacle 24 is advancable downward to engage the tubes 28. Accordingly the receptacles 28 may be, either fixedly or loosely held, within the receptacle depending upon the amount of force exerted by the set screw 29 upon the receptacle. By such arrangement the connector provides the ability for slight movement to accommodate rounded truss structures which may otherwise not be attainable by totally rigid connectors.

Figures 5, 6:
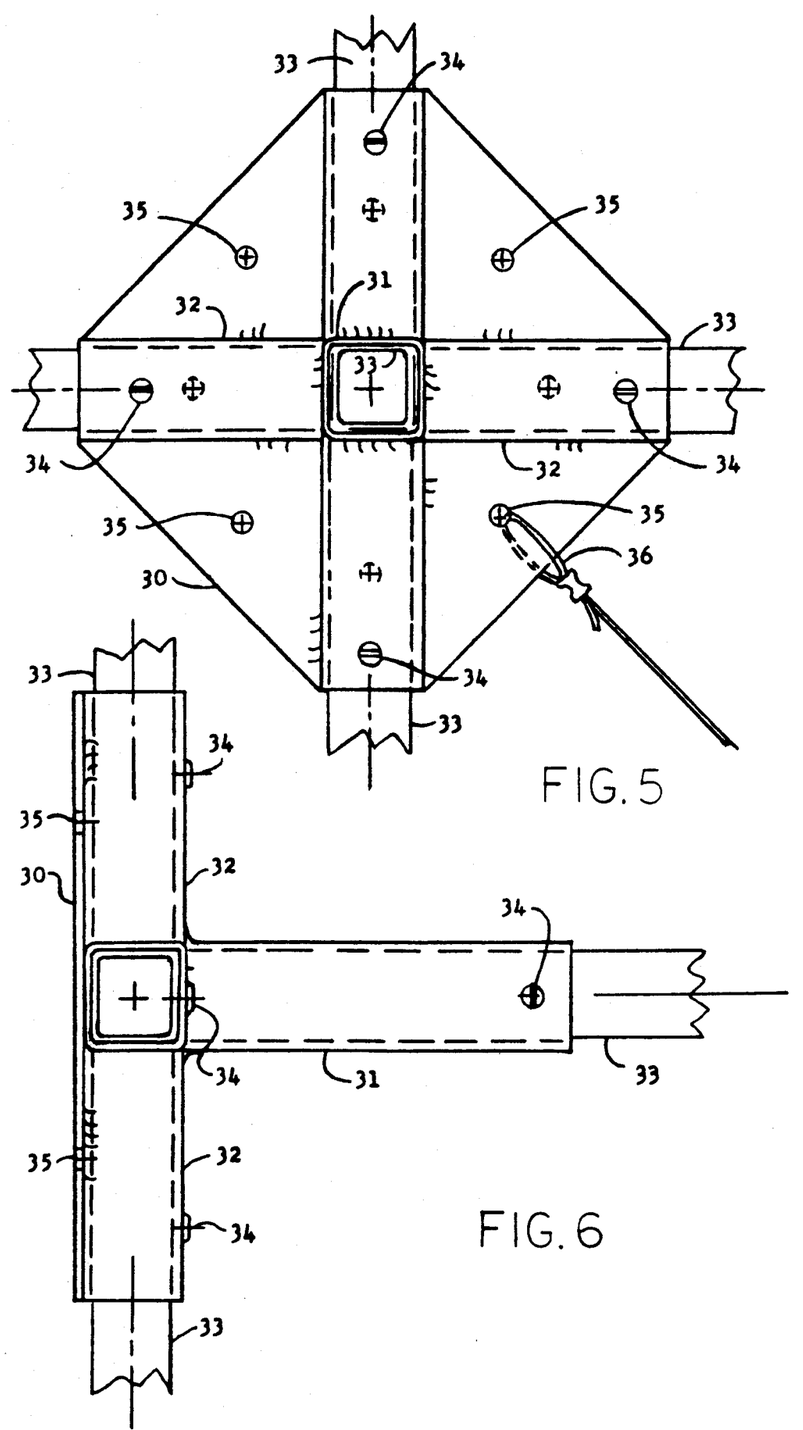
FIG. 5 is a top view of still another embodiment of a connector according to the invention.
FIG. 6 is a side elevation view of the connector of FIG. 5.

Referring now to FIGS. 5 and 6 there is shown still another embodiment of the present invention. Essentially planar base plate 30 has mounted thereon normally directed receptacle 31 and planar mounted receptacles 32. Mounting the receptacles 32 to the base plate 30 may be accomplished by any of a number of techniques such as welding. Receptacles 32 are oriented normal to each other and normal to receptacle 31. As shown in FIG. 5 and FIG. 6 the receptacles and tubing inserted therein are square in cross-section. Set screws 34 hold the tubes 33 within the receptacle 32 fixedly or loosely in accordance with the amount of tightening force applied to set screw 34. Disposed on the base plate 30 are through holes 35. Looped through hole 35 is a truss wire 36 crimped so as to maintain the wire coupled to the hole 35.

The truss wire 36 serves to urge together adjacent ones of selected connectors in a truss assembly. Although only one wire 36 is shown in FIG. 5 it is to be understood that one or more truss wires, each coupled within respective holes 35 is contemplated dependent upon the location of the respective connector in the truss assembly.

Figure 7:
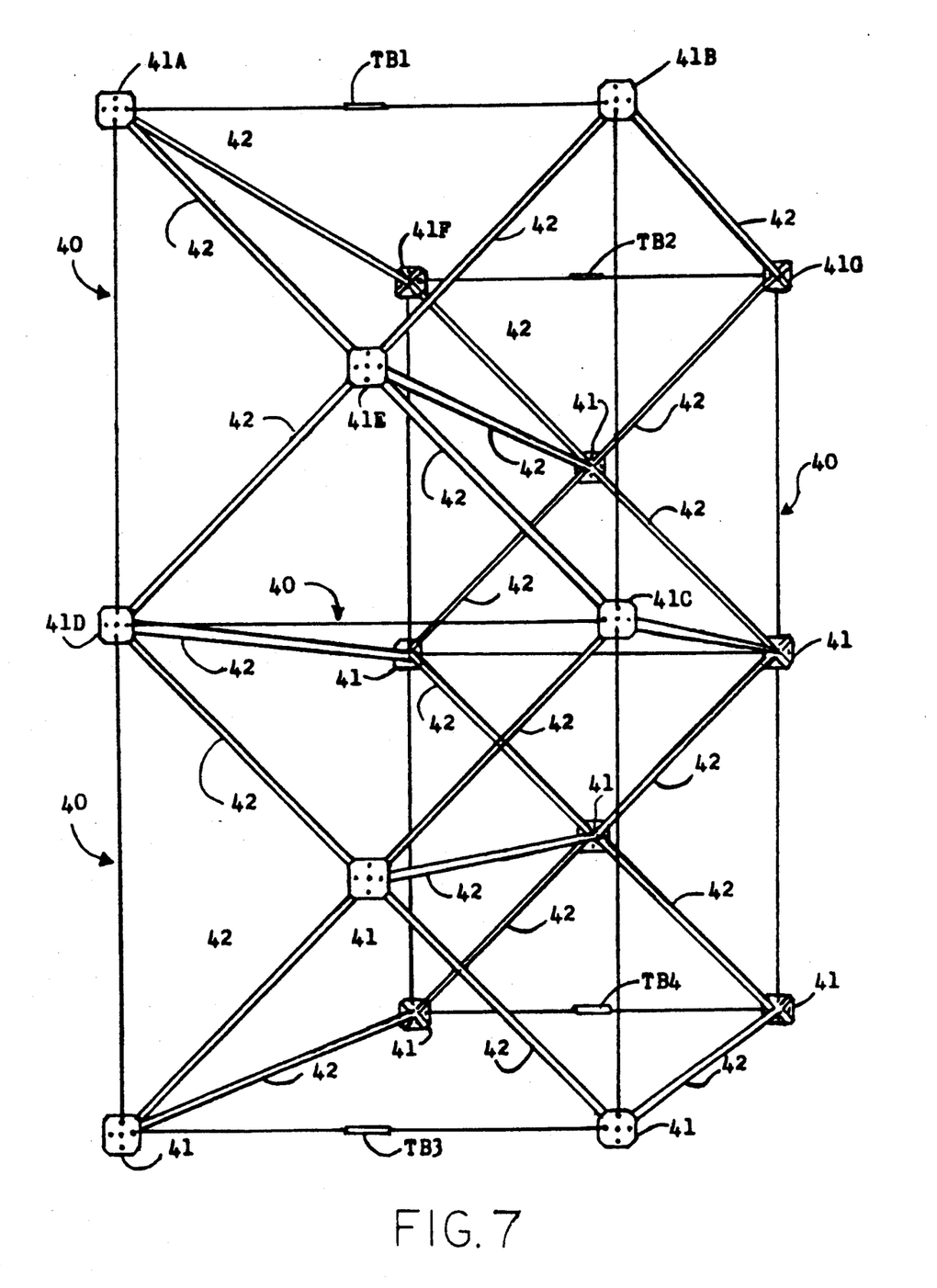
FIG. 7 is a perspective view of a portion of a truss assembly incorporating connectors according to the present invention, namely the connectors of FIGS. 5 and 6.

Referring now to FIG. 7 there is shown two truss assembly portions 40 of a larger truss assembly (not shown) embodying the inventive concepts heretofore described. Connectors 41 are interconnected by means of tubes 42 in "cell" arrangements comprising five connectors 41A, 41B, 41C, 41D and 41E. Although five connectors are shown it is to be understood that cells comprising four connectors (41E omitted in the configuration shown in FIG. 7) or three connectors or other arrangements are contemplated by the present invention. Tubes 42 are inserted into receptacles of adjacent connectors and secured into place by means of set screws (not shown) previously described. Each cell of five connectors is coupled to adjacent cells to then form an overall structure. Turn buckle TB1 which is coupled between respective connectors 41A and 41B through an interconnecting wire serves to urge connectors 41A and 41B together. In a similar manner TB2 serves to urge connectors 41F and 41G together. In a similar fashion additional turn buckles (not shown) may be inserted in wires between adjacent connectors to urge the respective connectors together. Accordingly each truss cell becomes a self-contained integral unit.

The number of cells in either the vertical or horizontal direction with respect to FIG. 7 are added in a manner solely determined by the final structure desired to be assembled. Each cell provides structural enhancement to the overall assembly and loss or damage of one cell as a result of an unforeseen event will not markedly affect the structural integrity of the overall assembly. The cells in the overall assembly support the remaining portion of the assembly by dividing the mechanical stresses existing in the assembly amongst a number of cells and sharing the load from adjacent cells.

Figure 8:
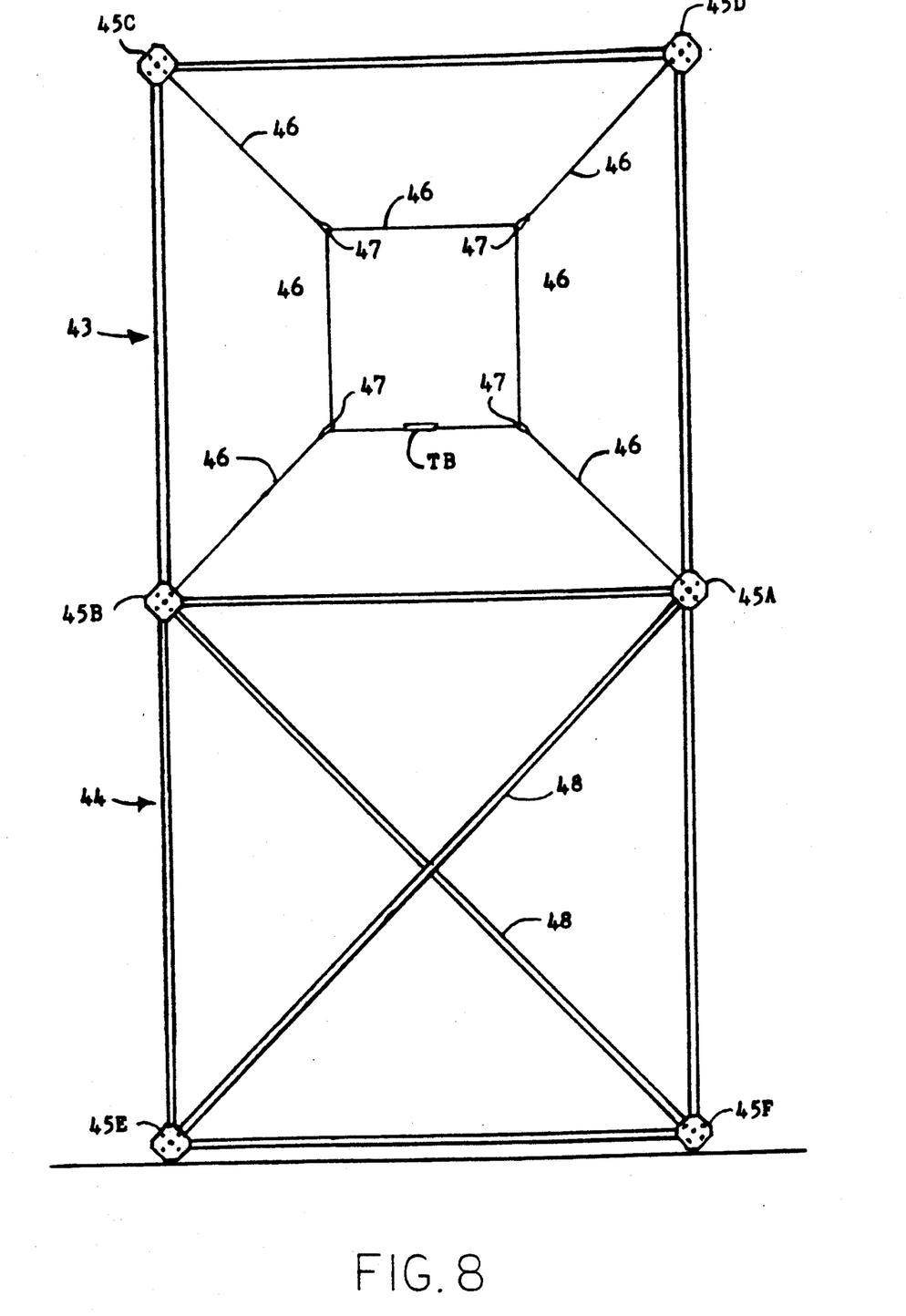
FIG. 8 is an elevation view of a portion of a truss assembly incorporating connectors according to the present invention utilizing tension means between selected adjacent ones of the connectors.

Referring now to FIG. 8 there is shown an alternative embodiment of a connector "cell" utilizing the connector of FIG. 5. The upper cell 43 includes truss wires 46 arranged in a "square" bracing arrangement with adjacent truss wires 46 coupled together at respective corners 47. A turn buckle TB secured to one of the truss wires 46 when tightened, draws the connectors 45A, 45B, 45C and 45D together. An alternative truss wire connection is shown in the "X" bracing arrangement of cell 44. Truss wires 48 are connected between diagonally opposite connectors 45B and 45F and 45A and 45E respectively. The selections of truss wire arrangements are dependent upon size and load carrying requirements of the truss assembly. In this manner adjacent connectors are drawn together to establish integral connector cells in an overall truss assembly.

Figure 9A:
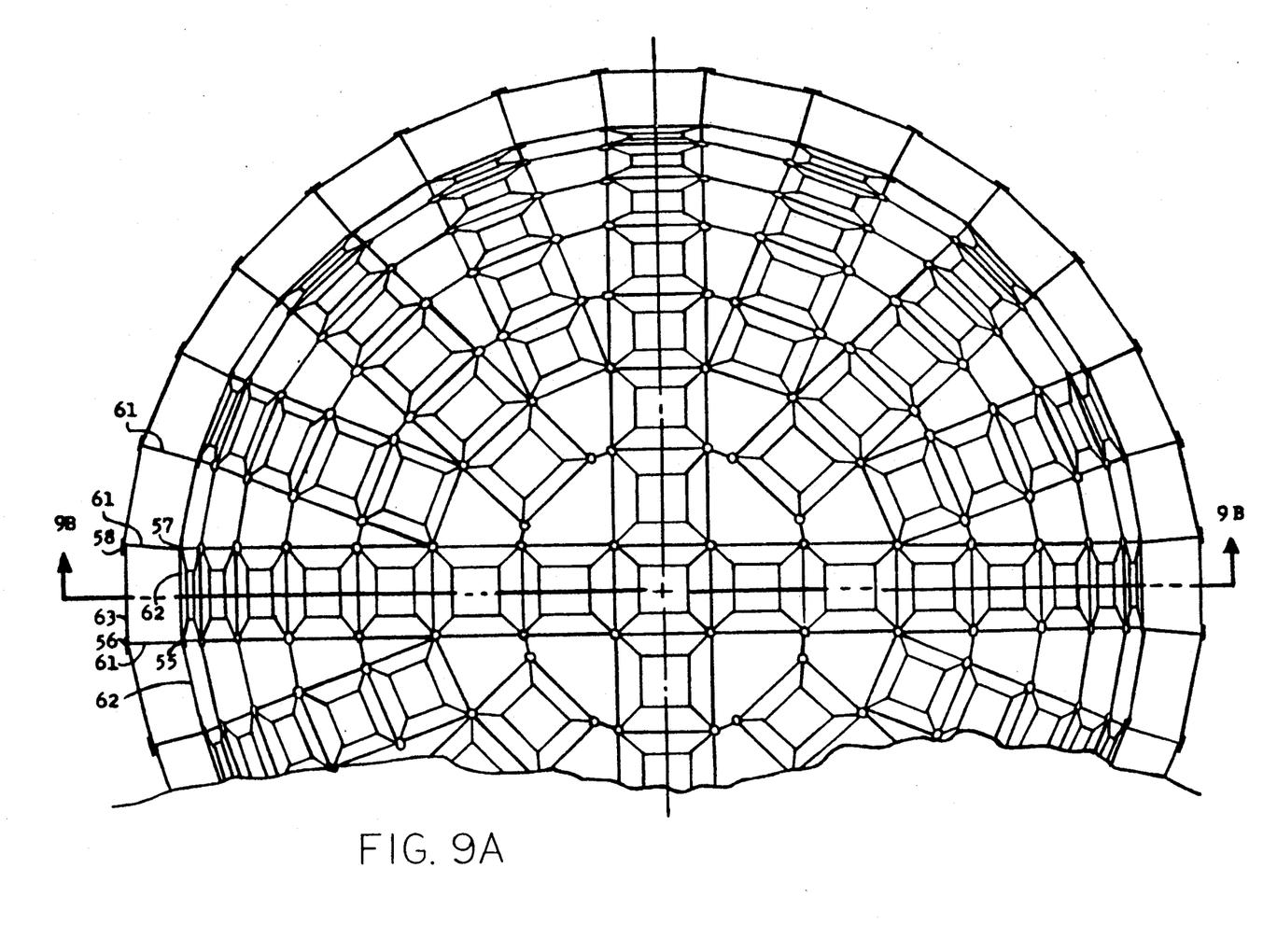
FIG. 9A is a front elevation partial cutaway perspective view of a truss assembly having unequal tube lengths for forming a spherical or domelike structure.

Referring to FIG. 9A there is shown yet another truss arrangement utilizing the connector of FIG. 3, for an assembly forming a semi-spherical or domelike contour with a cylindrical base. Truss assemblies formed in the manner shown are usable for large structures such as stadiums, air terminals, exhibition halls, as well as for temporary structures such as circus tents where set-up and tear-down times are important considerations, without compromising the strength requirements of the structure. The "cell" geometry of FIG. 9A is square with internal brace wires in a square configuration. It is to be understood that other geometrical shapes such as octagonal are also advantageously used in similar structures. Importantly, truss assemblies of the nature shown do not require the positive air pressure conditions dictated by inflatable pressurized dome structures. For purposes of clarity, except for the peripheral structure, the outer surface of the dome is not shown, but it is to be understood that the dome is formed in a semi-spherical honeycomb or "sandwich" type arrangement.

Figure 9B:
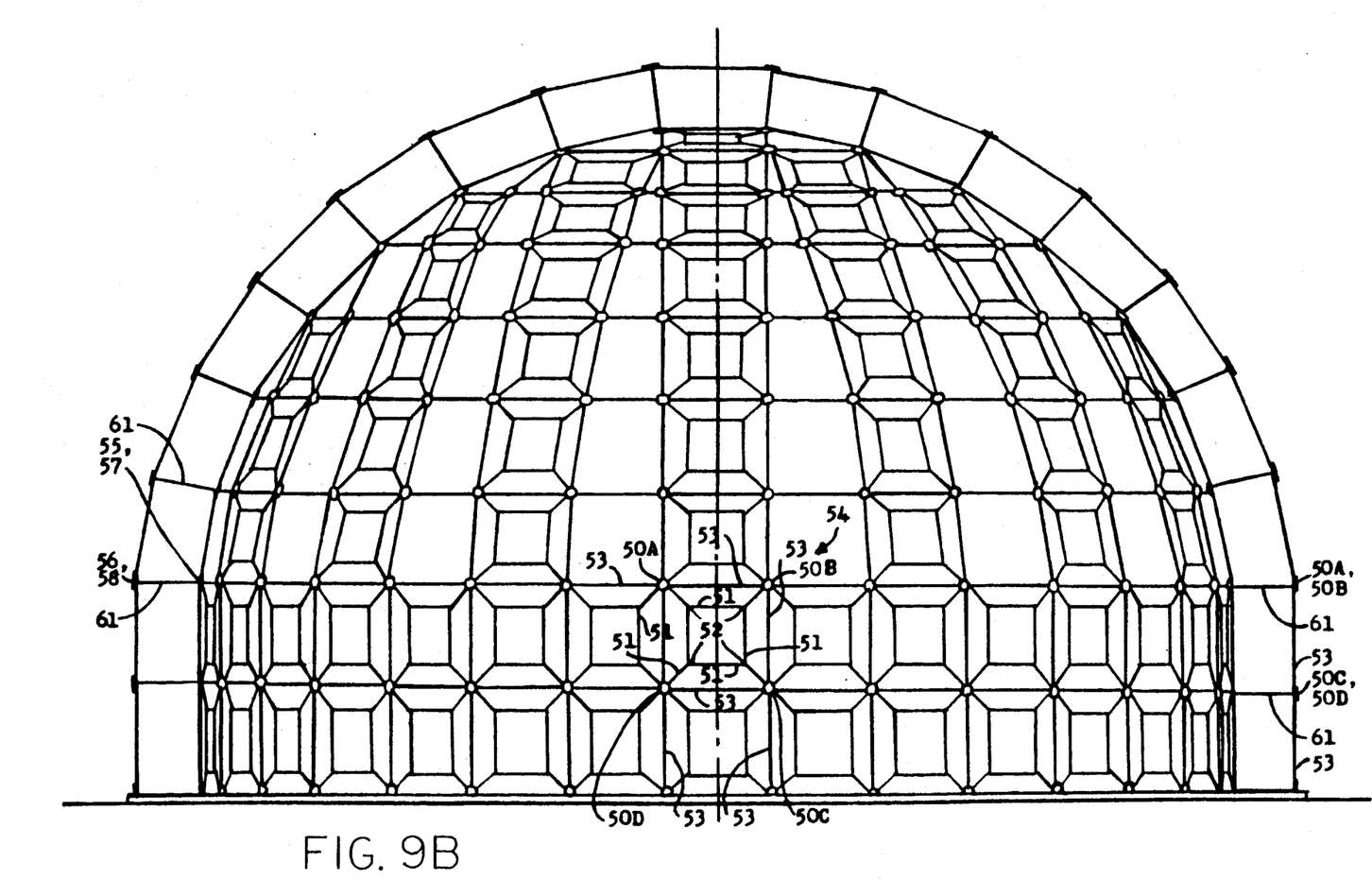
FIG. 9B is a sectional view of the structure of FIG. 9A along lines 9B.

Referring to FIG. 9A and FIG. 9B, connectors 50A, 50B, 50C and 50D form a cell 54 having a square shape. The connectors 50 are urged towards each other by truss wires 51 arranged in a square arrangement with adjacent individual truss wires 51 coupled together at respective corners 52. Four additional truss wires 51 couple corners 52 to respective connectors 50. Also coupled to adjacent connectors are respective tubes 53 which complete each square shaped cell structure.

The truss wires 51 may be secured together and to the connectors 50A, 50B, 50C and 50D by any one of a number of conventional techniques. Urging the connectors together may be accomplished by the use of turn buckles interposed in the truss wires 51 or other conventional tightening devices known in the art.

The contour shaping of adjacent cells is best illustrated by reference to the cylindrical wall edge portion of the dome structure shown in FIG. 9A. More specifically, connectors 55 and 57 are included in a truss cell that is upstanding and forms a part of the inner surface of the base of the semi-spherical dome. The remaining two connectors of the cell lie in line with respective ones of the connectors 55 and 57 and therefore are not shown. Similarly, connectors 56 and 58 are included in a truss cell that is upstanding and forms a part of the outer surface of the base of the semi-spherical dome. The remaining connectors which are in line with respective ones of connectors 56 and 58 are therefore not shown.

Corresponding facing cells forming an inner and outer portion of the dome are spaced apart a distance determined by equal length tubes 61. The curvature of adjacent cells is established by having the interior tubing 62 of a shorter length than exterior tubing 63. In this manner wedge-shaped combinations of spaced apart cells are formed. The general shape of the wedges are determined by the difference in interior and exterior tube lengths. Obviously the greater the difference in interior and exterior tube lengths, the more pronounced the wedge shape. In a similar fashion the cells which are coupled above the first row of cells of the dome have the interior tubing of a shorter length than the exterior tubes, which results in the curving inward of the cell combinations forming thereby a dome-like structure.

For structures desired to be cylindrical rather than spherical, then the interior tube lengths would be less than the exterior tube lengths, but side tube lengths of the individual cells would be of equal length. In this manner the cell combinations would form a circumference of the cylinder but would not turn inward as in the case of the dome structure.

As mentioned previously the tubing is of similar but smaller cross-section with respect to corresponding connector receptacle cross-sections. By virtue of the smaller cross-section not only is ease of assembly realized, but jamming of the tubing and the connectors is avoided and the contouring of cells and cell combinations is facilitated. Additionally the angle between adjacent receptacles when made unequal provides additional flexibility to form structures other than planar, cylindrical or spherical.

Figure 10A:
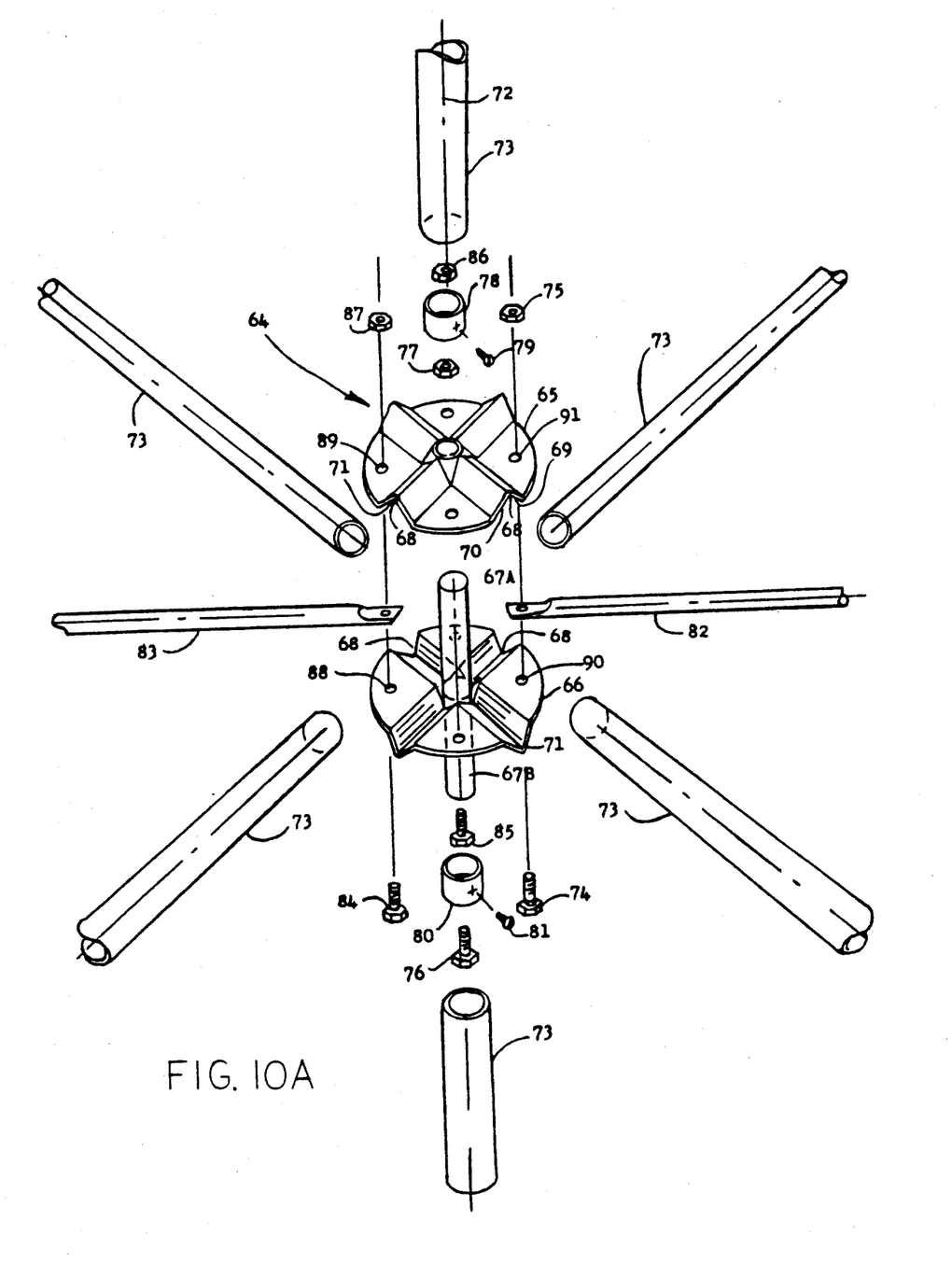
FIG. 10A is an exploded perspective view of yet still another embodiment of a connector according to the invention.
Figure 10B:
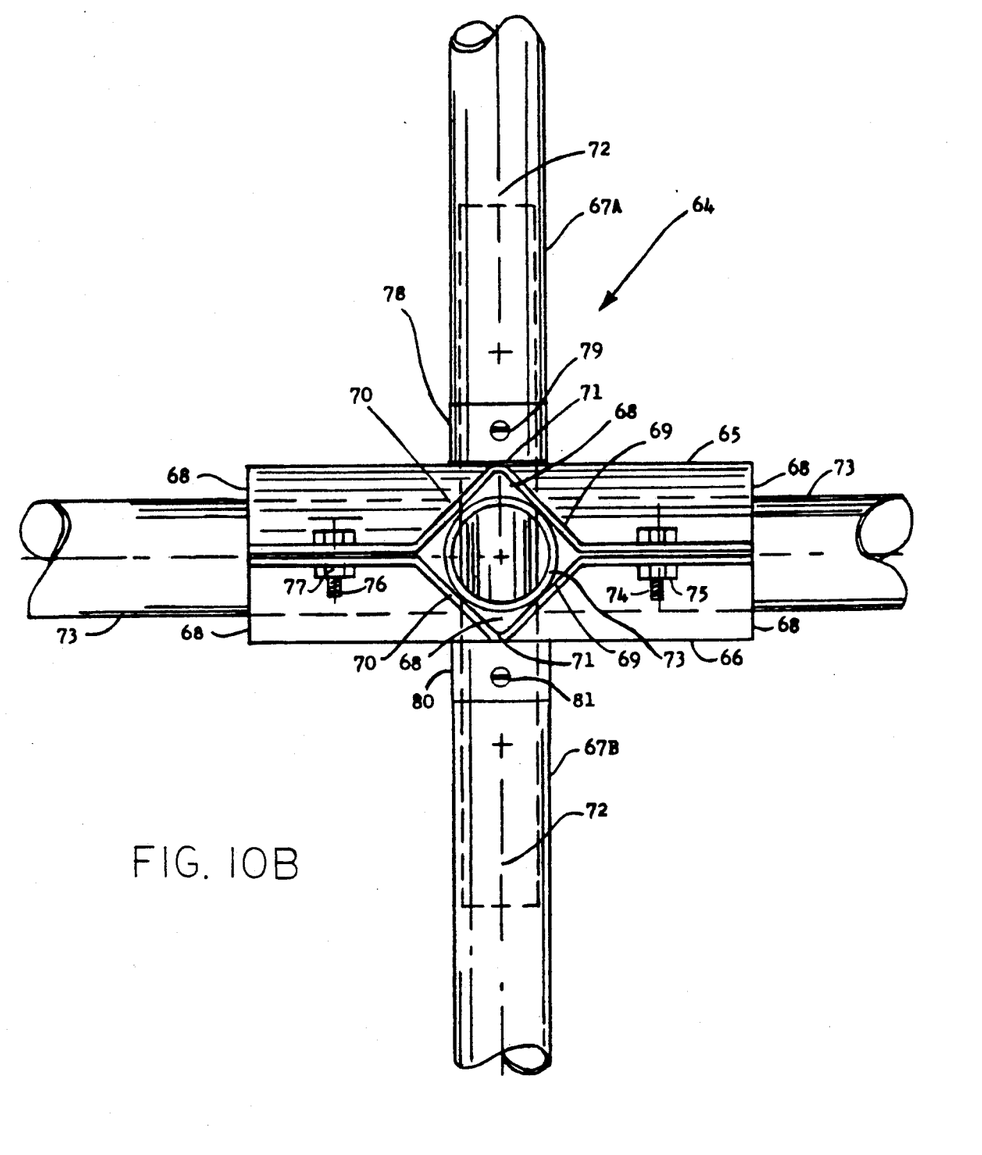
FIG. 10B is a side elevation view of the connector of FIG. 10A.

Referring now to FIGS. 10A and 10B there is shown yet another alternate embodiment of the present invention. The connector 64 comprises two symmetrical cover portions 65 and 66 which conform in shape and are assembled in a matching relationship. More specifically, cover portion 65 is slidably mounted on hollow receptacle portion 67A and cover portion 66 is mounted on hollow receptacle portion 67B. Cover portion 65 functions in a manner similar to that described for cover portion 5 of FIG. 1 and thus will not be repeated here.

The cover portion has a plurality of indentations 68 having side walls 69 and 70 and an apex 71. The apex 71 lies along a radius originating from receptacle axis 72. Each indentation 68 has a triangular cross-section defined by the side walls 69 and 70 that open toward the cover portion 65. The indentations of cover portions 65 and 66 form a closed area having a square cross-section for gripping tubing 73 held therebetween. Bolts 74 and 76 extend through cover portions 65 and 66 respectively. Bolt nuts 77 and 86 engage bolts 76 and 85 respectively and upon tightening urge cover portions 65 and 66 together thereby gripping tubing 73 between the cover portions. Similar bolting arrangements (not shown) are located symmetrically between the other indentations disposed on the cover portions. As may be apparent the structure of FIG. 10A provides for the gripping of varying sized tubing. Thus for larger sized tubing the cover portions will be held further apart whereas for smaller sized tubing the cover portions will be held closer together.

Collar 78 is slidably mounted on receptacle portion 67A and locked in place by set screw 79. Similarly collar 80 is slidably mounted on receptacle portion 67B and locked in place by set screw 81. In such manner the connectors 65 and 66 are fixed in stationary condition on receptacles 67A and 67B, while gripping tubing 73 therebetween.

Braces 82 and 83 shown only in FIG. 10A are coupled to the connector 64 either between the cover portions 65 and 66 as shown in FIG. 10A or upon the outer surfaces of the cover portions 65 and 66. Brace 82 is secured to the connector 64 by means of bolt 74, which passes through apertures 90 and 91, and nut 75 which when tightened, urges the cover plates 65 and 66 together. Similarly brace 83 is secured to the connector 64 by means of bolt 84, which passes through apertures 88 and 89, and nut 87 which when tightened urges the cover plates 65 and 66 together. Only two braces are shown, however, it is to be understood that three or four braces may be used depending upon "cell" configuration. As previously discussed the braces 82 and 83 are also connected to adjacent connectors for coupling such connectors together in a truss assembly.

I claim:

1. A connector for interconnecting tubing comprising:
   an essentially planar base having a planar surface and having a central axis orthogonal to the plane of the base;
   receptacle means secured to and projecting from the base, said receptacle means being coaxial with the central axis and being shaped to receive and nonrigidly secure an end of a piece of tubing extending along the central axis;
   a cover having a peripheral edge and an aperture receiving the receptacle means therethrough, the cover having a plurality of indentations extending radially realtive to the central axis, each indentation being disposed radially between the aperture and the peripheral edge of the cover, each indentation opening toward the base providing thereby means for slideably receiving an end of a piece of tubing disposed within the indentation between the planar surface of the base and the cover in abutting relationship with the receptacle means; and
   urging means for urging the cover toward the base to nonrigidly secure an end of a piece of tubing within the indentation between the base and the cover and in abutting relationship with the receptacle means, and with said end portion being in direct abutting relationship with said receptacle means.

2. A connector according to claim 1 wherein the indentations have a generally triangular cross-section.

3. A connector according to claim 2 further comprising:
   second aperture means disposed on the base and cover comprising a plurality of paired coaxial apertures, one aperture of a pair located on the base, the other aperture of a pair located on the cover;
   and adjustable locking bolt means extending through each pair of apertures and urging the base and the cover together in locking relationship.

4. A connector for interconnecting tubing comprising:
   a substantially planar base extending in a base plane and having a central axis orthogonal to the base plane;
   first receptacle means for receiving and nonrigidly securing an end of a piece of generally axially extending tubing secured to and projecting from the base, the first receptacle means being substantially coaxial with the central axis and receiving the end of the piece of tubing in sliding, abutting relationship;
   second receptacle means disposed along a surface of the planar base that lies in the base plane, the second receptacle means comprising a plurality of hollow receptacles, each receptacle lying along a radius of the central axis and being shaped to slideably receive and nonrigidly secure an end of a piece of generally radially extending tubing, the end of the generally radially extending tubing being secured in direct abutting relationship with the first receptacle means.

5. A connector according to claim 4 further comprising:
   aperture means defining a plurality of spaced apart apertures in the planar base.

* * * * *